Oct. 21, 1952 D. LIPPEY 2,614,451
FISHING LINE
Filed Sept. 6, 1949
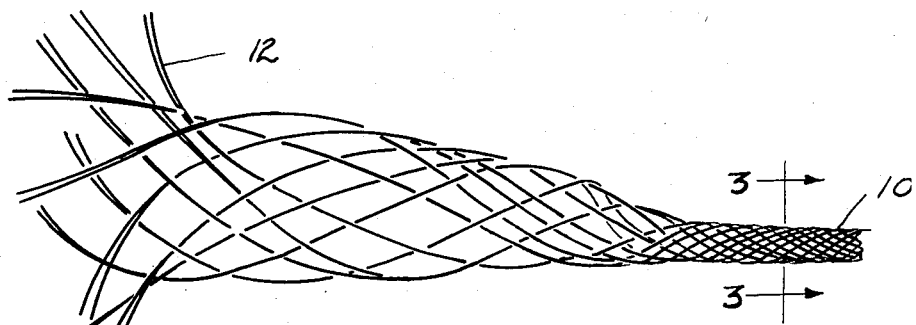
Fig.1.
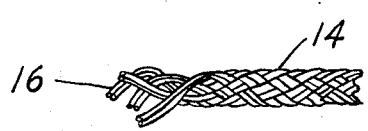
Fig.2.
Fig.3.
Fig.4.
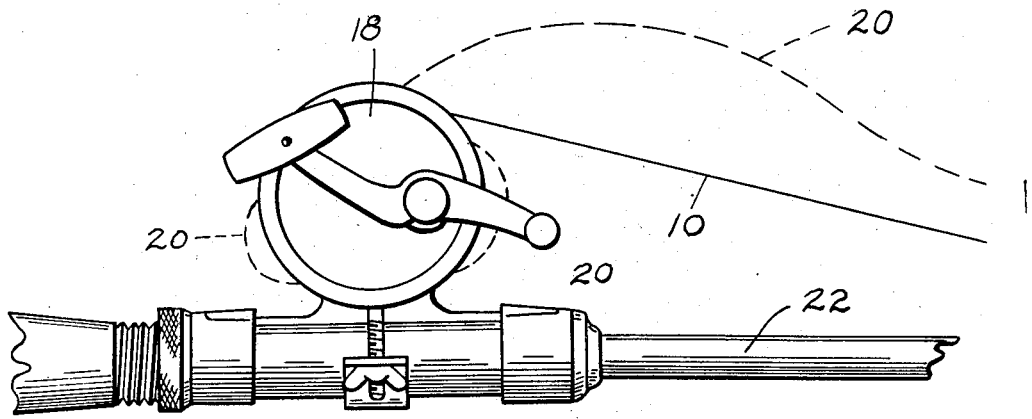
Fig.5.
DAVID LIPPEY
INVENTOR.
BY Albert J. Fihe
ATTORNEY Patented Oct. 21, 1952

2,614,451

UNITED STATES PATENT OFFICE 2,614,451

FISHING LINE

David Lippey, Glendale, Calif.

Application September 6, 1949, Serial No. 114,231

2 Claims. (Cl. 87—9)

This invention relates to an improved fishing line and has for one of its principal objects the provision of a line which can be used for practically all types of fishing and which presents quite a number of advantages over present lines.

One of the important objects of this invention is to provide a line for use with fishing reels, which, when a cast is made, will have no tendency to what is technically known as "backlash," even under the most adverse conditions.

Another object of the invention is to provide a fishing line, which, when used with reels of the type known as "spinning" reels, will not become twisted even though successive casts are made with a line running off the flange of the reel or spool, in which event the reel or spool does not turn.

Another important object of the invention is to provide a braided fishing line which will have a tubular contour and which can be made of a varied number of strands, each strand comprising a single filament often known as mono-filament.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of one end of a section of an improved fishing line constructed in accordance with the principles of this invention and showing the same with a somewhat frayed end to more clearly illustrate the structure.

Figure 2 is a view somewhat similar to Figure 1 but showing a different type of braiding.

Figure 3 is a sectional view taken on the line 3—3 of Figure 1.

Figure 4 is a section of a line shown in Figure 2.

Figure 5 shows the improved fishing line of this invention wound on a reel which is mounted on a rod and illustrating in full lines the action of the improved fishing line of this invention with a contrasting showing of an ordinary line, this being shown in dash lines.

As shown in the drawings:

The reference numeral 10 indicates generally a section of improved fishing line constructed in accordance with the principles of this invention, the same being braided to comprise a tubular shape, this being greatly exaggerated in both Figures 1 and 3, and the braiding composed of a plurality of single filaments, one of which is illustrated at 12. These single filaments are distinguished from the usual type of composite threads which are used to costruct the ordinary fishing line, each thread in that case being made up of a number of very fine filaments, such as silk, nylon or the like.

In the present invention, each single filament is much heavier and such are described in the trade as mono-filaments and these are then braided into a line of tubular cross section and these mono-filaments are usually employed in groups of four. For example, a line may be made up of four single filaments, eight single filaments, such as shown at 14 in Figure 2, an individual filament, being indicated at 16.

In the structure shown in Figure 1, twenty filaments are employed, this being a multiple of four, but more or less can be used in the construction so long as there is a combination of four, this being to facilitate the braiding operation.

In Figure 5 the line 10 is shown as applied to a reel 18 which may be of any usual or ordinary construction and when the line, after being wound on the reel 18, is unwound therefrom in a casting operation, the reel ordinarily must be braked or its motion retarded in some fashion, either by what is known as a "drag" or by "thumbing."

With an ordinary line, such as is indicated at 20 in Figure 5, a casting operation with the rod 22 and the reel 18 will impart considerable velocity to the spool of the reel 18, and when the line 20 begins to slow down toward the end of the cast it will inevitably buckle, as shown by the additional dotted line in Figure 5, which is commonly known as "backlash" or a "birdnest."

This tendency to backlash has been a very objectionable difficulty which presents itself in all casting operations, particularly so far as amateur fishermen are concerned, and considerable casting technique and thumbing skill, not to mention the proper use of the drag, is required in order to overcome this tendency to backlash on the part of the ordinary fishing line.

It has been found that the line of this invention will not backlash under practically all conditions and the theory is that this is due, at least in part, to the tubular construction which adds a certain amount of lineal rigidity and also resists any tendency to flatten out into a ribbon-like form. Additionally, the tubular construction or circular cross section of the line of this invention will present, under practically all circumstances, a limited surface of frictional contact with other elements, there being practically a linear contact due to the circular structure, which is obviously less than any planar contact which would result from a line which is flattened on one or more surfaces or which presents a ribbon-like cross section.

When the improved fishing line of this invention is employed with what is known as a spinning reel, namely one where the reel is rotated through an angle of approximately ninety degrees before a cast is made and which then results in the line coming off the flange of the spool of the reel as distinguished from running off its axis of revolution, any tendency to twist the line in this spin casting operation will be resisted to a considerable extent by the tubular construction, and as the tube is imparted, the braided tubular contour will act to remove the twist as the line is rewound upon the spool of the reel.

The tubular construction of this line can be supplemented by a core which may comprise either a single filament or a plurality of filaments. The tubular construction is not necessarily always circular in cross section but may be elliptical and, in some cases, the tube may be flattened into practically a ribbon with substantially no inner space.

While the structure hereof is primarily intended for a fishing line, the same can be employed for other purposes, such as strings for tennis and badminton rackets and in any other environment where this tubular construction, either hollow or reinforced with a core, is found expedient.

The line, when used for fishing purposes, will not "birdnest" on the reel, will resist kinking and tangling, and when used with the spinning reel will resist the tendency to twist. When employed for casting purposes, casts up to fifty percent longer can be made with the same equipment and the line will wear approximately twice as long as others under the same conditions.

When made of material which is translucent and with substantially no outstanding color, it will be found to be almost invisible in or on the water, this, of course, being a distinct advantage for fishing purposes.

When used as a string or "gut" for tennis and badminton rackets, the fact that the line is braided as distinguished from a single filament, will provide a better grip on the surface of the ball or bird, thereby enabling greater accuracy employed.

It will be evident that herein is provided a completely new fishing line which, by virtue of its inherent resistance to tangling, twisting, overrunning and backlashing, will provide a boon to fishermen, particularly amateurs who, by the use of this new line, will be able to make longer and more accurate casts without the ever present danger of snarling, twisting and tangling their lines, either on the reel or during the cast.

The plurality of single filament strands braided into the tubular construction imparts a rigidity and solidity of structure whereby buckling, twisting and flattening is almost completely eliminated, even under the most adverse conditions of use. No additional coating or lacquering is necessary and the filaments being preferably of nylon, will act even more consistently when wet, thereby imparting a further advantage.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A fishing line comprising a coreless tubular braided structure, the braiding composed of a plurality of filaments arranged in groups of two or more in parallel untwisted relationship and braided in fours or multiples thereof.

2. A fishing line comprising a coreless tubular structure composed of nylon monofilaments of circular cross-section braided in fours or multiples thereof.

DAVID LIPPEY.

REFERENCES CITED

The following references are of record in the file of this patent:

UNITED STATES PATENTS

| Number | Name | Date |
|--------|------|------|
| 1,371,067 | Bird | Mar. 8, 1921 |
| 1,475,859 | Nyman | Nov. 27, 1923 |
| 2,064,974 | Hale | Dec. 22, 1936 |
| 2,065,606 | Moore | Dec. 29, 1936 |
| 2,164,296 | Wilcox | June 27, 1939 |
| 2,339,950 | Sackner | Jan. 25, 1944 |
| 2,494,389 | Jeckel | Jan. 10, 1950 |

FOREIGN PATENTS

| Number | Country | Date |
|--------|---------|------|
| 500,077 | Great Britain | Feb. 2, 1939 |